(12) United States Patent
Yoshimine et al.

(10) Patent No.: US 11,261,908 B2
(45) Date of Patent: Mar. 1, 2022

(54) TILTING PAD BEARING (71) Applicant: Mitsubishi Hitachi Power Systems, Ltd., Yokohama (JP)

(72) Inventors: Chihiro Yoshimine, Tokyo (JP); Tanehiro Shinohara, Tokyo (JP); Takuzo Shigihara, Tokyo (JP); Shuichi Isayama, Tokyo (JP); Yuichiro Waki, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/754,252

(22) PCT Filed: Oct. 24, 2018

(86) PCT No.: PCT/JP2018/039459
§ 371 (c)(1),
(2) Date: Apr. 7, 2020

(87) PCT Pub. No.: WO2019/087890
PCT Pub. Date: May 9, 2019

(65) Prior Publication Data
US 2020/0277985 A1  Sep. 3, 2020

(30) Foreign Application Priority Data
Oct. 31, 2017 (JP) .............................. JP2017-211141

(51) Int. Cl.
*F16C 17/03* (2006.01)
*F16C 27/02* (2006.01)
*F16C 17/24* (2006.01)

(52) U.S. Cl.
CPC ............ *F16C 17/03* (2013.01); *F16C 17/243* (2013.01); *F16C 27/02* (2013.01)

(58) Field of Classification Search
CPC ........ F16C 17/03; F16C 17/035; F16C 17/06; F16C 17/065; F16C 17/243; F16C 27/02;
(Continued)

(56) References Cited

U.S. PATENT DOCUMENTS 2,167,882 A    8/1939  Fast
3,398,997 A *  8/1968  Wucherer ............... F16C 17/06
                                                     384/307
(Continued)

FOREIGN PATENT DOCUMENTS

CN    101761546 A    6/2010
CN    103119311 A    5/2013
(Continued)

OTHER PUBLICATIONS

Machine Translation of JP-2018159462-A (Year: 2018).*
(Continued)

*Primary Examiner* — Alan B Waits
(74) *Attorney, Agent, or Firm* — Westerman, Hattori, Daniels & Adrian, LLP (57) ABSTRACT

A tilting pad bearing including pads disposed around a rotating shaft so as to face an outer peripheral surface of the rotating shaft, liners each supporting an outside of the pad in a radial direction with an axis of the rotating shaft as a center, and pivots each supporting an outside of the liner in the radial direction with the axis as a center at a central position of the liner in an axial direction of the rotating shaft so as to allow the pad to be swingable, wherein a recessed portion recessed in a direction away from the pad is formed on a surface of the liner facing the pad or a surface of the pad facing the liner at least at the central position thereof in the axial direction of the rotating shaft.

2 Claims, 6 Drawing Sheets

(58) Field of Classification Search
CPC .... F16C 37/00; F16C 37/002; F16C 33/1025; F05D 2240/54
See application file for complete search history.

(56) References Cited

U.S. PATENT DOCUMENTS

| | | | | |
|---|---|---|---|---|
| 4,636,095 | A | * 1/1987 | Gerling | ........... F16C 17/03 384/114 |
| 2010/0220944 | A1 | 9/2010 | Waki et al. | |
| 2013/0287325 | A1 | * 10/2013 | Stocker | ........... F16C 37/00 384/129 |

FOREIGN PATENT DOCUMENTS

| | | | | |
|---|---|---|---|---|
| CN | 205298262 U | | 6/2016 | |
| DE | 10130253 B4 | | 8/2004 | |
| JP | S61-7616 U | | 1/1986 | |
| JP | H09-79275 A | | 3/1997 | |
| JP | 10288220 A | * | 10/1998 | ........... F16C 17/24 |
| JP | 2001-124062 A | | 5/2001 | |
| JP | 2001-271829 A | | 10/2001 | |
| JP | 2010-203481 A | | 9/2010 | |
| JP | 2013-234746 A | | 11/2013 | |
| JP | 2018-159462 A | | 10/2018 | |
| JP | 2018159462 A | * | 10/2018 | ........... F16C 33/124 |

OTHER PUBLICATIONS

Machine Translation of JP-10288220-A (Year: 1998).*
International Search Report dated Dec. 25, 2018, issued in counterpart application No. PCT/JP2018/039459, with English translation. (4 pages).
Written Opinion dated Dec. 25, 2018, issued in counterpart application No. PCT/JP2018/039459, with English translation. (14 pages).

* cited by examiner

TILTING PAD BEARING

TECHNICAL FIELD

The present invention relates to a tilting pad bearing.
Priority is claimed on Japanese Patent Application No. 2017-211141 filed Oct. 31, 2017, the content of which is incorporated herein by reference.

BACKGROUND ART

In a rotating machine such as a steam turbine and a gas turbine, it is common to support a shaft end of a rotating shaft with a bearing. Bearings are classified into a thrust bearing and a journal bearing depending on a direction where a load is supported. The thrust bearing supports a load in an axial direction of the rotating shaft. The Journal bearing supports the load in a radial direction of an axis.

Patent Document 1 describes a journal bearing. The journal bearing described in Patent Document 1 supports the rotating shaft by a plurality of pads arranged in a circumferential direction of the rotating shaft. An oil film of lubricating oil is formed between the pad and an outer peripheral surface of the rotating shaft.

Here, there is a bearing called as a tilting pad bearing among pad-type bearings. In the tilting pad bearing, each pad is swingably supported by a pointed pivot provided on an inner peripheral surface of a housing.

CITATION LIST

Patent Document

Patent Document 1: Japanese Unexamined Patent Application, First Publication No. 2010-203481

SUMMARY OF INVENTION

Technical Problem

However, in a journal bearing as described in Patent Document 1, in a case where a bearing load is increased, in a low-speed rotation region where contact between a pad surface and a rotor surface occurs, most of a contact pressure between a rotor and a pad is concentrated near the pivot, and local plastic flow may occur near the pivot of the pad.

The present invention has been made in view of the above circumstances, and provides a tilting pad bearing that can suppress a rise in pad temperature and local plastic flow and can stably support a rotating shaft.

Solution to Problem

The following configuration is adopted to solve the above problem. According to an aspect of the present invention, a tilting pad bearing includes pads disposed around a rotating shaft so as to face an outer peripheral surface of the rotating shaft, liners each supporting an outside of the pad in a radial direction with an axis of the rotating shaft as a center, and pivots each supporting an outside of the liner in the radial direction with the axis as a center at a central position of the liner in an axial direction of the rotating shaft so as to allow the pad to be swingable, wherein a recessed portion recessed in a direction away from the pad is formed on a surface of the liner facing the pad or a surface of the pad facing the liner at least at the central position thereof in the axial direction of the rotating shaft.

With such a configuration, the recessed portion is formed at one of the central positions of the surface of the liner facing the pad and the surface of the pad facing the liner, and a gap is formed between the liner and the pad. That is, when a bearing load is applied to the pad in a case where the recessed portion is formed in the liner, a portion of the pad adjacent to the recessed portion bends and enters into the gap, and the contact pressure at a position of the inside corresponding portion in the radial direction can be reduced. Similarly, when the bearing load is applied to the pad in a case where a recessed portion is formed in the pad, the central position of the pad where the recessed portion is formed bends and the gap decreases, so that the contact pressure at the position of the inside corresponding portion in the radial direction can be reduced. As a result, the distribution of the contact pressure between the pad and the rotating shaft can be prevented from being concentrated only near the position supported by the pivot, and the distribution of the contact pressure can be averaged. Therefore, it is possible to suppress an increase in pad temperature and an occurrence of local plastic flow.

According to a second aspect of the present invention, the recessed portion according to the first aspect may be formed in an arc shape when viewed from a direction orthogonal to the axis.

With such a configuration, a corner portion is not formed in the recessed portion. Therefore, when the pad is bent, and contact between the pad and the inner surface of the recessed portion or contact between the liner and the inner surface of the recessed portion occurs under the condition that the bearing load is high, local corner hit can be avoided.

According to a third aspect of the present invention, the recessed portion according to the second aspect may include a small recessed portion formed at the central position in the axial direction, and wherein the small recessed portion may be formed in an arc shape having a smaller radius of curvature than that of the recessed portion when viewed from the direction orthogonal to the axis.

With such a configuration, the small recessed portion is formed in the recessed portion. Therefore, in a case where the bearing load is increased, the central position of the pad can be bent in two steps toward the small recessed portion. As a result, the distribution of the contact pressure between the pad and the rotating shaft can be further suppressed from being concentrated only near the pivot. Therefore, the thickness of the oil film on the pad can be kept more constant.

Advantageous Effects of Invention

According to the above-described tilting pad bearing, it is possible to suppress the rise in pad temperature and the occurrence of local plastic flow, and to stably support the rotating shaft.

DESCRIPTION OF EMBODIMENTS

First Embodiment

Next, a journal bearing according to a first embodiment of the present invention will be described with reference to the drawings.

Figure 1:
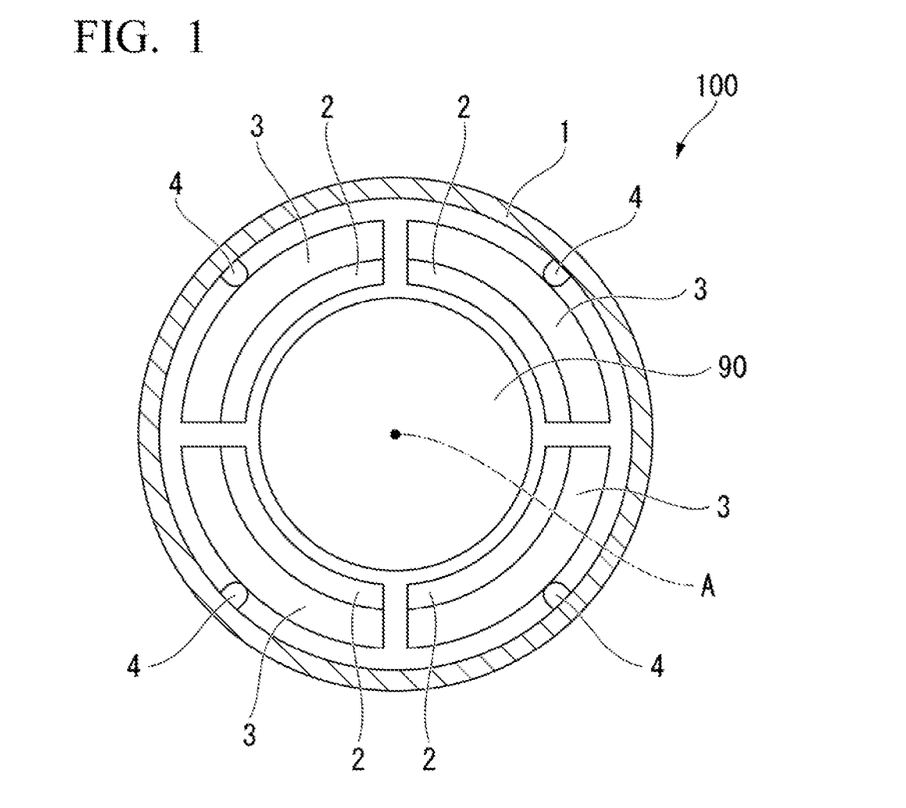
FIG. 1 is a view of a tilting pad bearing according to a first embodiment of the present invention as viewed from an axial direction.
Figure 2:
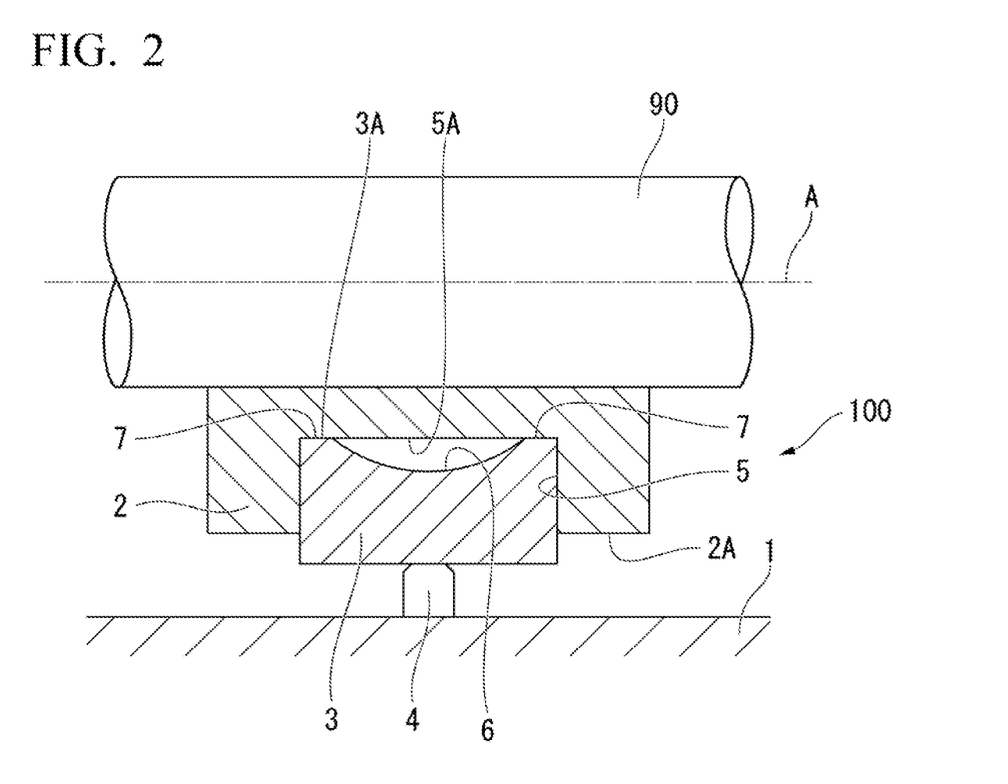
FIG. 2 is a cross-sectional view of the tilting pad bearing according to the first embodiment of the present invention as viewed in a plane including an axis.

As shown in FIGS. 1 and 2, a tilting pad bearing 100 of the embodiment is used to support a load of a rotating shaft 90 rotating around an axis A in a radial direction with the axis A as a center. The tilting pad bearing 100 is provided with an annular housing 1 having the axis A as the center, a plurality of (for example, four) pads 2 disposed at intervals in a circumferential direction along an outer peripheral surface of the rotating shaft 90, a plurality of liners 3 each supporting an outer periphery of the pad 2 in the radial direction, and a plurality (fix example, four) of pivots 4 each supporting the liner 3 on an inner peripheral surface of the housing 1.

The rotating shaft 90 is used as a rotor of a rotating machine such as a steam turbine or a gas turbine. In the embodiment, the rotating shaft 90 has a column shape with the axis A as the center. The rotating shaft 90 rotates around the axis A.

The pad 2 has a plate shape curved alone the outer peripheral surface of the rotating shaft 90. The pad 2 is integrally formed of a metal material such as white metal. In the embodiment, four pads 2 are arranged at intervals in the circumferential direction of the axis A. Lubricating oil is supplied between the inner peripheral surface of the pad 2 and the outer peripheral surface of the rotating shaft 90 by an oil supply device (not shown). The lubricating oil forms an oil film between the pad 2 and the rotating shaft 90.

Each pad 2 is supported for its outer periphery by the liner 3 in the radial direction. As shown in FIG. 1, in a case where viewed from an axis A direction, the liner 3 has a curved plate shape having substantially the same radius of curvature as the pad 2. The liner 3 is supported by the pivot 4 provided on the inner peripheral surface of the housing 1. The pivot 4 has an inside end portion in the radial direction formed into, for example, a pointed shape, and supports the liner 3 at a point. As a result, the liner 3 is capable of being swingable at a tip end portion of the pivot 4 as a center.

FIG. 2 is a cross-sectional view of the rotating shaft 90 and the tilting pad bearing 100 in a plane including the axis A.

As shown in FIG. 2, the liner 3 is housed in a housing recessed portion 5 formed on an outside surface 2A facing toward the outside in the radial direction with respect to the axis A among the surfaces of the pad 2. The housing recessed portion 5 is recessed in the shape of a square groove toward an inside in the radial direction with respect to the axis A on the outside surface 2A. In a sectional view on a plane including the axis A, a bottom surface 5A of the housing recessed portion 5 has a planar shape extending substantially parallel to the axis A. The dimension of the liner 3 in the axis A direction is smaller than the dimension of the pad 2 in the axis A direction, and is slightly smaller than the dimension of the housing recessed portion 5 in the axis A direction. The pivot 4 supports the liner 3 from the outside in the radial direction at a central position in the axis A direction of the liner 3.

A recessed portion 6 recessed in a direction away from the pad 2 (in other words, toward the outside in the radial direction with the axis A as the center) is formed on an inside surface 3A of the liner 3 (that is, surface facing the pad 2). The recessed portion 6 has an arc-shaped inner surface having a predetermined radius of curvature in a sectional view including the axis A shown in FIG. 2, that is, when viewed from a direction orthogonal to the axis A.

The recessed portion 6 exemplified in the embodiment is formed in a shallow round groove shape having the same radius of curvature at all positions in the direction orthogonal to the axis A (front and rear directions on sheet surface in FIG. 2). The end surfaces on both sides in the axis A direction of the recessed portion 6 in the liner 3 formed in this manner are abutting portions 7 that abut against the outside surface 2A of the pad 2 (bottom surface 5A of the housing recessed portion 5).

The predetermined radius of curvature of the recessed portion 6 in the liner 3 can be determined by simulation or the like based on, for example, a material of the liner 3, a shape of the liner 3, a shape of the pad 2, a maximum value of a bearing load applied to the pad 2, and the like. The dimension of the recessed portion 6 in the axis A direction may be ½ or more, and may be ⅔ or more, the dimension of the liner 3 in the axis A direction.

According to the first embodiment, the recessed portion 6 is formed at the central position of the liner 3 facing the pad 2. Therefore, a gap is formed between the liner 3 and the pad 2. That is, the liner 3 supports the bearing load applied to the pad 2 by a portion excluding the recessed portion 6 (gap). In other words, both sides of the liner 3 adjacent to the recessed portion 6 are pressed by the pad 2. In a case where the bearing load is increased, the pad 2 slightly bends in the radial direction with the axis A as the center in a direction where the gap of the recessed portion 6 is narrow. When the bending of the pad 2 increases and the displacement of the bottom surface 5A of the housing recessed portion 5 due to the bending is larger than the gap, the inner surface of the recessed portion 6 comes into contact with the bottom surface 5A of the housing recessed portion 5 of the pad 2 and is pressed by the pad 2. As a result, the distribution of the contact pressure between the pad 2 and the rotating shaft 90 is suppressed from being concentrated only near the position supported by the pivot 4 (in other words, near the position supported by the pivot 4), and the distribution of the contact pressure of the rotating shaft 90 with respect to the pad 2 can be averaged.

Figure 3:
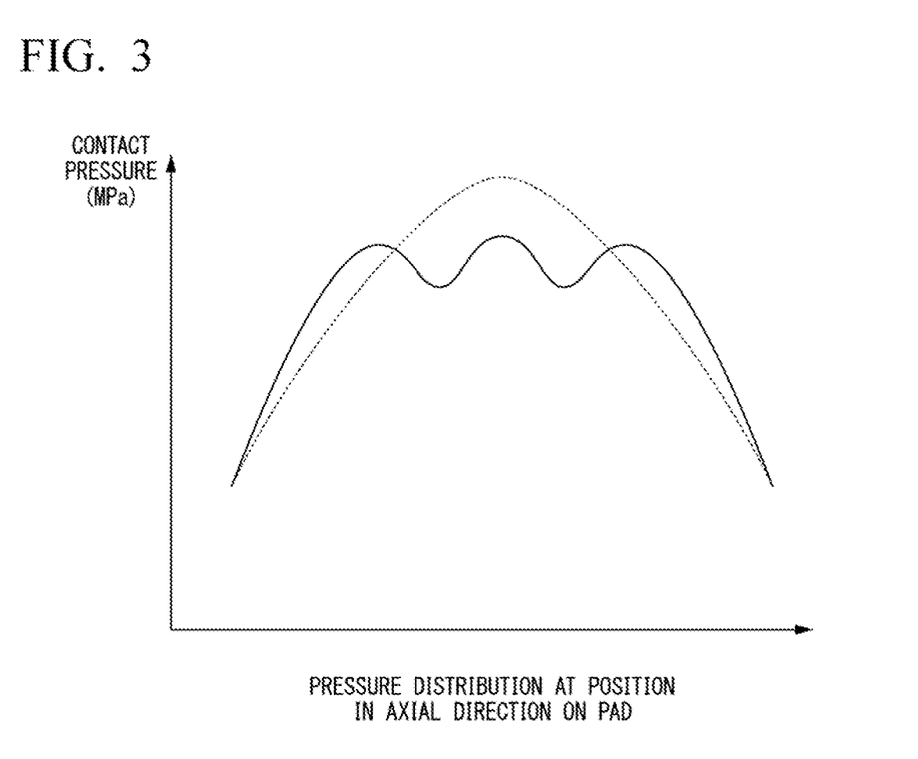
FIG. 3 is a graph showing a pressure distribution at a position in the axial direction on a pad of the tilting pad bearing according to the first embodiment of the present invention.

FIG. 3 is a graph showing the distribution of the contact pressure of the pad 2 in the axis A direction.

In FIG. 3, the solid line shows the pressure distribution in a case where the recessed portion 6 is formed in the liner 3 as in the embodiment, and the broken line shows the pressure distribution in a case where the recessed portion 6 is not formed in the liner 3.

As shown by the broken line in FIG. 3, when the bearing load increases in the case where the recessed portion 6 is not formed, the pressure distribution of the pad 2 has a mountain shape (in other words, inverted V-shape), and a peak of the contact pressure appears at a central position supported by the pivot 4.

On the other hand, in the case where the recessed portion 6 is formed in the liner 3, as shown by the solid line, even when the bearing load increases, the peak value of the pressure distribution is smaller than that of the case where the recessed portion 6 shown by the broken line is not formed, and the number of peaks increases from one to three. That is, the pressure distribution is averaged without the contact pressure being concentrated on a local portion such as the central position.

As a result, it is possible to suppress a rise in pad temperature and an occurrence of local plastic flow.

Furthermore, since no corner portion is formed in the recessed portion 6, when the pad 2 is bent and the pad 2 comes into contact with an inner surface of the recessed portion 6, local corner hit can be avoided. As a result, a sudden increase in local contact surface pressure between the outer peripheral surface of the rotating shaft 90 and the inner peripheral surface of the pad 2 can be avoided.

Second Embodiment

Next, a second embodiment of the present invention will be described with reference to the drawings. The second embodiment is different from the first embodiment only in the configuration of the liner 3. Therefore, the same parts as those in the first embodiment will be described with the same reference numerals, and a redundant description will be omitted.

Figure 4:
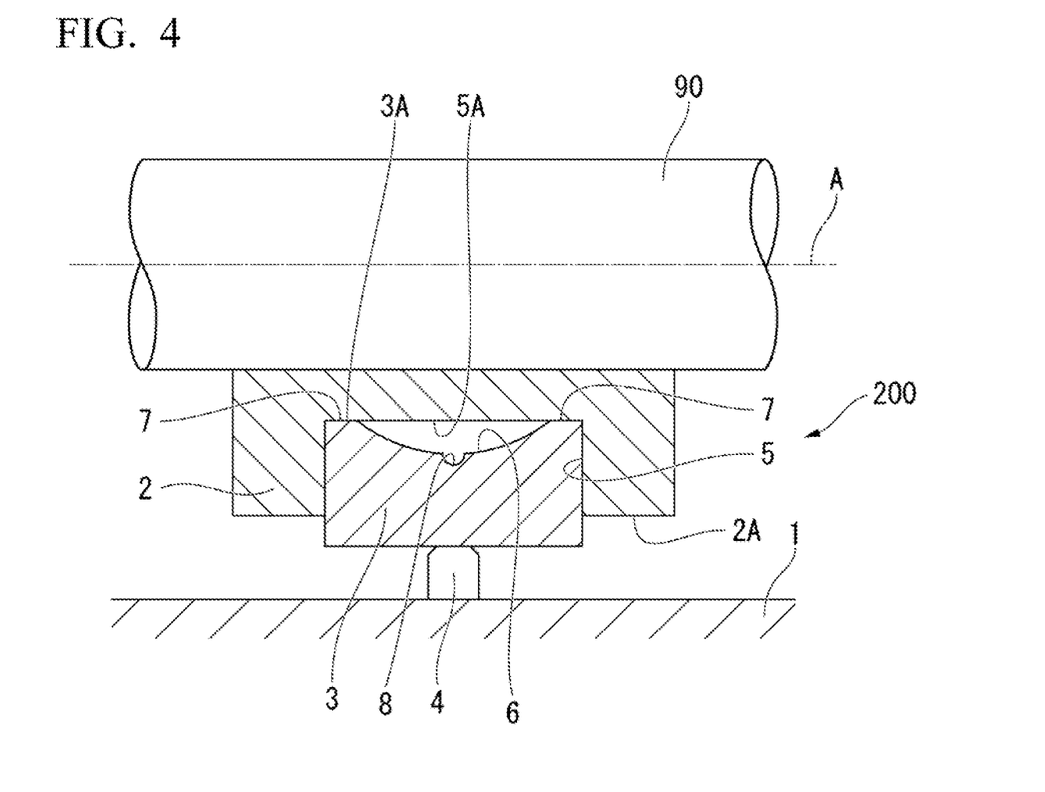
FIG. 4 is a cross-sectional view of a tilting pad bearing according to a second embodiment of the present invention.

As shown in FIG. 4, a recessed portion 6 is formed in the liner 3 of a tilting pad bearing 200 of the second embodiment. A small recessed portion 8 is formed in the recessed portion 6. The small recessed portion 8 is formed at the central position in the axis A direction in the recessed portion 6.

The small recessed portion 8 has a smaller radius of curvature than that of the recessed portion 6. In the embodiment, similarly to the recessed portion 6, the small recessed portion 8 is formed in a shallow round groove shape having the same radius of curvature at all positions in the direction orthogonal to the axis A (front and rear directions on sheet surface in FIG. 4). Here, the radius of curvature of the small recessed portion 8 may be set according to the peak value of the pressure distribution that appears at the center in a case where only the recessed portion 6 is formed. Similarly to the recessed portion 6, the radius of curvature of the small recessed portion 8 can be determined by simulation based on various conditions such as the shape and material of the pad 2 and the liner 3, for example.

Therefore, according to the second embodiment, since the small recessed portion 8 is further formed in the recessed portion 6, in the case where the bearing load is increased, the pad 2 can be bent in the radial direction with the axis A as the center, that is, in a direction where the gap between the bottom surface 5A of the housing recessed portion 5 and the inner surface of the recessed portion 6 is narrow. By forming the small recessed portion 8, it is possible to create a situation where a inner surface of the small recessed portion 8 is not in contact with the pad 2 even when the inner surface of the recessed portion 6 comes into contact with the pad 2. That is, as compared with the case where only the recessed portion 6 is formed, the peak of the load at the central position where the pivot 4 is disposed can be reduced even in the case where the bearing load is thriller increased by the amount corresponding to the formation of the small recessed portion 8. As a result, the distribution of the contact pressure between the pad 2 and the rotating shaft 90 can be further suppressed from being concentrated only in the vicinity of the pivot 4.

Figure 5:
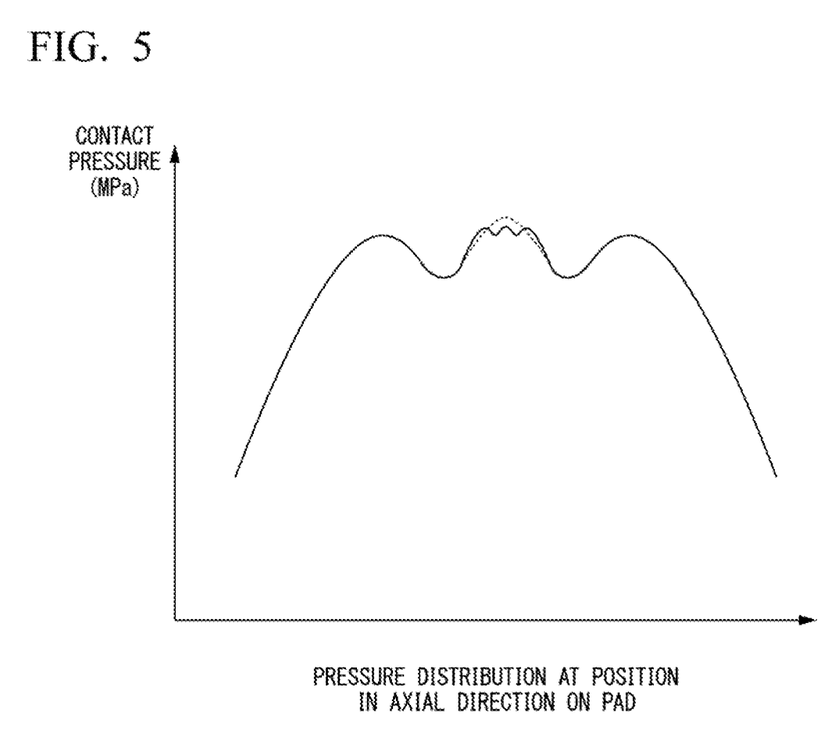
FIG. 5 is a graph showing a pressure distribution at a position in the axial direction on a pad of the tilting pad bearing according to the second embodiment of the present invention.

FIG. 5 is a graph showing the distribution of the contact pressure of the pad 2 in the axis A direction.

In FIG. 5, the solid line shows the pressure distribution in a case where the recessed portion 6 and the small recessed portion 8 are formed in the liner 3 as in the embodiment, and the broken line shows the pressure distribution in a case where only the recessed portion 6 is formed and the small recessed portion 8 is not formed in the liner 3.

As shown by the solid line in FIG. 5, in the case where the recessed portion 6 and the small recessed portion 8 are formed in the liner 3, the peak value of the pressure distribution is smaller than that of a case shown by the broken line, and the number of peaks increases from three to five. That is, the pressure distribution is averaged without the contact pressure being concentrated on a local portion such as a central position. As a result, it is possible to further suppress the rise in pad temperature and the occurrence of local plastic flow.

Third Embodiment

Next, a journal bearing according to a third embodiment of the present invention will be described with reference to the drawings. The journal bearing of the third embodiment differs from the above-described first embodiment only in that the recessed portion is formed on the pad side. Therefore, the same parts as those in the first embodiment will be described with the same reference numerals, and redundant description will be omitted.

Figure 6:
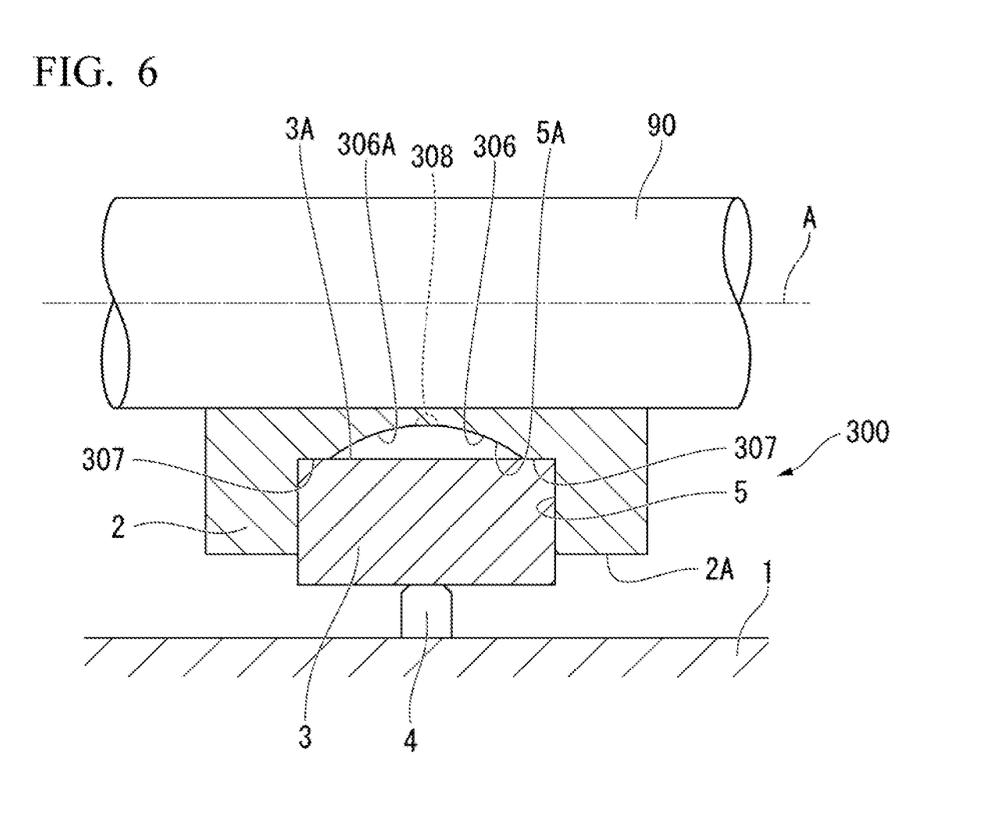
FIG. 6 is a cross-sectional view corresponding to FIG. 2 in a third embodiment of the present invention.

FIG. 6 is a cross-sectional view corresponding to FIG. 2 in the third embodiment of the present invention.

As shown in FIG. 6, a tilting pad bearing 300 according to the third embodiment is provided with the housing 1, the pad 2, the liner 3, and the pivot 4.

The liner 3 is housed in the housing recessed portion 5 formed on the outside surface 2A of the pad 2 facing toward the outside in the radial direction with the axis A as the center. The housing recessed portion 5 is recessed in the shape of a square groove toward an inside in the radial direction with respect to the axis A on the outside surface 2A. The inside surface 3A of the liner 3 (that is, surface facing the pad 2) has a planar shape extending substantially parallel to the axis A in a sectional view cert a plane including the axis A.

The dimension of the liner 3 in the axis A direction is smaller than the dimension of the pad 2 in the axis A direction, and is slightly smaller than the dimension of the housing recessed portion 5 in the axis A direction.

The pivot 4 supports the liner 3 from the outside in the radial direction at a central position in the axis A direction of the liner 3.

A recessed portion 306 recessed in a direction away from the liner 3 (in other words, toward the inside in the radial direction with the axis A as the center) is formed on the bottom surface 5A of the housing recessed portion 5 (that is, surface facing the inside surface 3A of the liner 3). The recessed portion 306 has an arc-shaped inner surface having a predetermined radius of curvature in a sectional view including the axis A shown in FIG. 6, that is, when viewed from a direction orthogonal to the axis A, similarly to the recessed portion 6 of the first embodiment described above.

The recessed portion 306 exemplified in the embodiment is formed in a shallow round groove shape having the same radius of curvature at all positions in the direction orthogonal to the axis A (front and rear directions on sheet surface in FIG. 6). The end surfaces (bottom surface 5A of the housing recessed portion 5) on both sides in the axis A direction of the recessed portion 30 in the pad 2 formed in this manner are abutting portions 307 that abut against the inside surface 3A of the liner 3.

Similarly to the first embodiment, the predetermined radius of curvature of the recessed portion 306 in the pad 2 is determined by simulation or the like, for example, the material of the pad 2, the shape of the liner 3, the shape of the pad 2, and the maximum value of the bearing load applied to the pad 2, and the like. The dimension of the recessed portion 306 in the axis A direction may be ½ or more, and may be ⅔ or more, the dimension of the liner 3 in the axis A direction.

According to the third embodiment, the recessed portion 306 is formed at the central position of the pad 2 facing the liner 3. Therefore, a gap is formed between the liner 3 and the pad 2. That is, the liner 3 supports the bearing load applied to the pad 2 by the portion excluding the recessed portion 306 (gap). In other words, both sides of the liner 3 adjacent to the recessed portion 306 are pressed by the pad 2. In the case where the bearing load is increased, the pad 2 slightly bends in the radial direction with the axis A as the center in a direction where the gap of the recessed portion 306 is narrow. When the bending of the pad 2 increases and the displacement of the inner surface 306A of the recessed portion 306 due to the bending is larger than the gap, the inner surface 306A of the recessed portion 306 comes into contact with the inside surface 3A of the liner 3 to press the liner 3. As a result, the distribution of the contact pressure between the pad 2 and the rotating shaft 90 is suppressed from being concentrated only near the position supported by the pivot 4 (in other words, near the position supported by the pivot 4), and the distribution of the contact pressure of the rotating shaft 90 with respect to the pad 2 can be averaged.

Similarly to the above-described second embodiment, a small recessed portion 308 (shown by a broken line in FIG. 6) formed in an arc shape having a smaller radius of curvature than that of the recessed portion 306 may be formed inside the recessed portion 306 of the third embodiment when viewed from a direction orthogonal to the axis A.

The present invention is not limited to the configuration of each embodiment described above, and the design can be changed without departing from the gist of the present invention.

For example, in each of the above-described embodiments, a configuration in which four pads 2 are provided is described. However, the number of pads 2 is not limited to four, and may be four or less, or five or more.

Furthermore, in the second embodiment described above, an example in which only one small recessed portion 8 is formed in the recessed portion 6 is described. However, it is also possible to further form another small recessed portion in the small recessed portion 8 in an overlapping manner. According to such a configuration, the number of pressure distribution peaks can be increased according to the number of these recessed portions 6, small recessed portions 8, and other small recessed portions. As a result, the contact pressure between the pad 2 and the rotating shaft 90 is dispersed, and the concentration of the contact pressure only in the vicinity of the pivot 4 can be further reduced.

INDUSTRIAL APPLICABILITY

According to the above-described tilting pad bearing, it is possible to suppress the rise in pad temperature and the occurrence of local plastic flow, and to stably support the rotating shaft.

REFERENCE SIGNS LIST

1 Housing
2 Pad
2A Outside surface
3 Liner
3A Inside surface
4 Pivot
5 Housing recessed portion
5A Bottom surface
6, 306 Recessed portion
306A Inner surface
7 Abutting portion
8, 308 Small recessed portion
90 Rotating shaft
100, 200, 300 Tilting pad bearing
A Axis

The invention claimed is:

1. A tilting pad bearing comprising:
pads disposed around a rotating shaft so as to face an outer peripheral surface of the rotating shaft;
liners each supporting an outside of the pad in a radial direction with an axis of the rotating shaft as a center; and
pivots each supporting an outside of the liner in the radial direction with the axis as a center at a central position of the liner in an axial direction of the rotating shaft so as to allow the pad to be swingable, wherein
a recessed portion recessed in a direction away from the pad or the liner is formed on a surface of the liner facing the pad or a surface of the pad facing the liner at least at the central position thereof in the axial direction of the rotating shaft, the recessed portion being a gap between the pad and the liner in the radial direction wherein
the recessed portion is formed in an arc shape when viewed from a direction orthogonal to the axis, wherein
in a case where a bearing load applied to the pad is increased, the pad bends in the radial direction such that the gap between the pad and the liner becomes narrower in the radial direction, and wherein
in a case where the bearing load applied to the pad is increased, a bending of the pad increases and the surface of the pad facing the liner comes into contact with the liner at the central position thereof, the liner is pressed by the surface of the pad facing the liner.

2. The tilting pad bearing according to claim 1, wherein the recessed portion includes a small recessed portion formed at the central position in the axial direction, and wherein the small recessed portion is formed in an arc shape having a smaller radius of curvature than that of the recessed portion when viewed from the direction orthogonal to the axis.

* * * * *